(12) United States Patent
Zwiebach (10) Patent No.: US 8,655,754 B2
(45) Date of Patent: Feb. 18, 2014

(54) INTERCOMPANY TRANSACTIONS ELIMINATION SYSTEM

(75) Inventor: Robert C. Zwiebach, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 836 days.

(21) Appl. No.: 12/027,493

(22) Filed: Feb. 7, 2008

(65) Prior Publication Data
US 2009/0204515 A1 Aug. 13, 2009

(51) Int. Cl.
*G06Q 20/22* (2012.01)

(52) U.S. Cl.
USPC .............. 705/30; 705/35; 705/37; 705/38

(58) Field of Classification Search
USPC ........................................ 705/1, 30
See application file for complete search history.

(56) References Cited

U.S. PATENT DOCUMENTS

| | | | |
|---|---|---|---|
| 7,895,093 B2 * | 2/2011 | Macalka et al. | 705/30 |
| 2003/0195780 A1 * | 10/2003 | Arora et al. | 705/7 |
| 2003/0204427 A1 * | 10/2003 | Gune et al. | 705/8 |
| 2005/0038721 A1 * | 2/2005 | Goeckel et al. | 705/30 |
| 2005/0256789 A1 * | 11/2005 | Matsuoka | 705/30 |
| 2005/0289023 A1 | 12/2005 | Hahn-Carlson et al. | |
| 2006/0206506 A1 | 9/2006 | Fitzpatrick | |
| 2006/0229958 A1 | 10/2006 | Sergio et al. | |
| 2006/0253372 A1 * | 11/2006 | Leffler | 705/37 |
| 2006/0294003 A1 * | 12/2006 | Snyder et al. | 705/38 |
| 2007/0168209 A1 * | 7/2007 | Shah | 705/1 |
| 2007/0185791 A1 | 8/2007 | Chan et al. | |

OTHER PUBLICATIONS

"Oracle General Ledger", 2006, pp. 1-4, (author unknown).
"Oracle Financials Centralized Solution Set", 2006, pp. 1-3, (author unknown).
"Oracle Financial Consolidation Hub", 2006, pp. 1-6, (author unknown).

* cited by examiner

*Primary Examiner* — Talia Crawley
(74) *Attorney, Agent, or Firm* — Miles & Stockbridge P.C.

(57) ABSTRACT

A financial computer system at a holding company receives an approval of an intercompany transaction between two related subsidiary entities. The system generates an eliminating entry for the intercompany transaction at the time and every time it receives an approval, thereby providing timely and accurate financial information for the holding company.

17 Claims, 9 Drawing Sheets

| | | | Status | Approved |
|---|---|---|---|---|
| Number | CT00000003 | | | |
| Sender | Operations | Receiver | Distribution | |
| Period | Dec-97 | Period | Dec-97 | GL Date | 15-DEC-1997 |
| Type | I/C Sales | Currency | USD | Entered Date | 16-DEC-1997 |
| Description | Intercompany Sales Transfer | | Approved Date | 16-DEC-1997 |
| Note | | | Control | |
| Transferred to: | Sender | Yes | Receiver | Yes | Reversed | No |

Elimination

| Sender | Receiver | | | | |
|---|---|---|---|---|---|
| Line | Account | | Debit | Credit |
| 10 | 91-402-5110-0000-000 | | | 40,000.00 |
| 20 | 91-402-4110-0000-000 | | 40,000.00 | |
| 30 | 91-000-1813-0000-000 | | 40,000.00 | |
| 40 | 91-000-2813-0000-000 | | | 40,000.00 |

Generate  Submit  Reverse  Delete

Fig. 9

INTERCOMPANY TRANSACTIONS ELIMINATION SYSTEM

FIELD OF THE INVENTION

One embodiment is directed generally to a financial computer system, and in particular to a financial computer system that handles intercompany transactions.

BACKGROUND INFORMATION

Managing intercompany transactions is one of the biggest challenges impacting finance departments. Intercompany transactions are transactions between two or more related internal legal entities with common control (i.e., in the same enterprise). Modern corporations engage in a huge number of transactions between the different legal entities within a corporate group, and while these transactions should be included in the financial statements for each affected entity, they should not be included in the financial statements for the corporate group overall, since for the corporate group they would be considered self-dealing. Therefore, a corporate group has to periodically eliminate such transactions.

One challenge arises because each legal entity that is party to an intercompany transaction typically records its half of the transaction independently of the other entity. If there are any differences in the way the two (or more) entities record the transaction, it can be very difficult to properly match and eliminate the transactions. This is especially problematic because this elimination process typically happens while a corporate group is trying to close the quarter or fiscal year, and holdups to the close process are to be avoided at nearly all cost.

Further, most legal entities in a corporation manage their business, including their financial information, autonomously. Corporate-level financial information typically only comes together at discrete time intervals, such as month-end, through a fairly complicated consolidation process. Many companies perform the consolidation process "manually" by exporting data from various systems to a spreadsheet. However, the emergence of Business Intelligence systems that give executives a daily snapshot on a "dashboard" of the state of the overall corporate business require more frequent updates of corporate-level information. Known Business Intelligent systems that give daily information do not rely on consolidated data and therefore do not generate accurate data. Instead, they merely generate an estimate of current financial activity.

SUMMARY OF THE INVENTION

One embodiment is a financial computer system at a holding company that receives an approval of an intercompany transaction between two related subsidiary entities. The system generates an eliminating entry for the intercompany transaction at the time and every time it receives an approval, thereby providing timely and accurate financial information for the holding company.

DETAILED DESCRIPTION

One embodiment is a corporate financial computer system that generates an accounting elimination entry every time an intercompany transaction is executed. The system can then generate accurate financial information at all times for the overall company.

Figure 1:
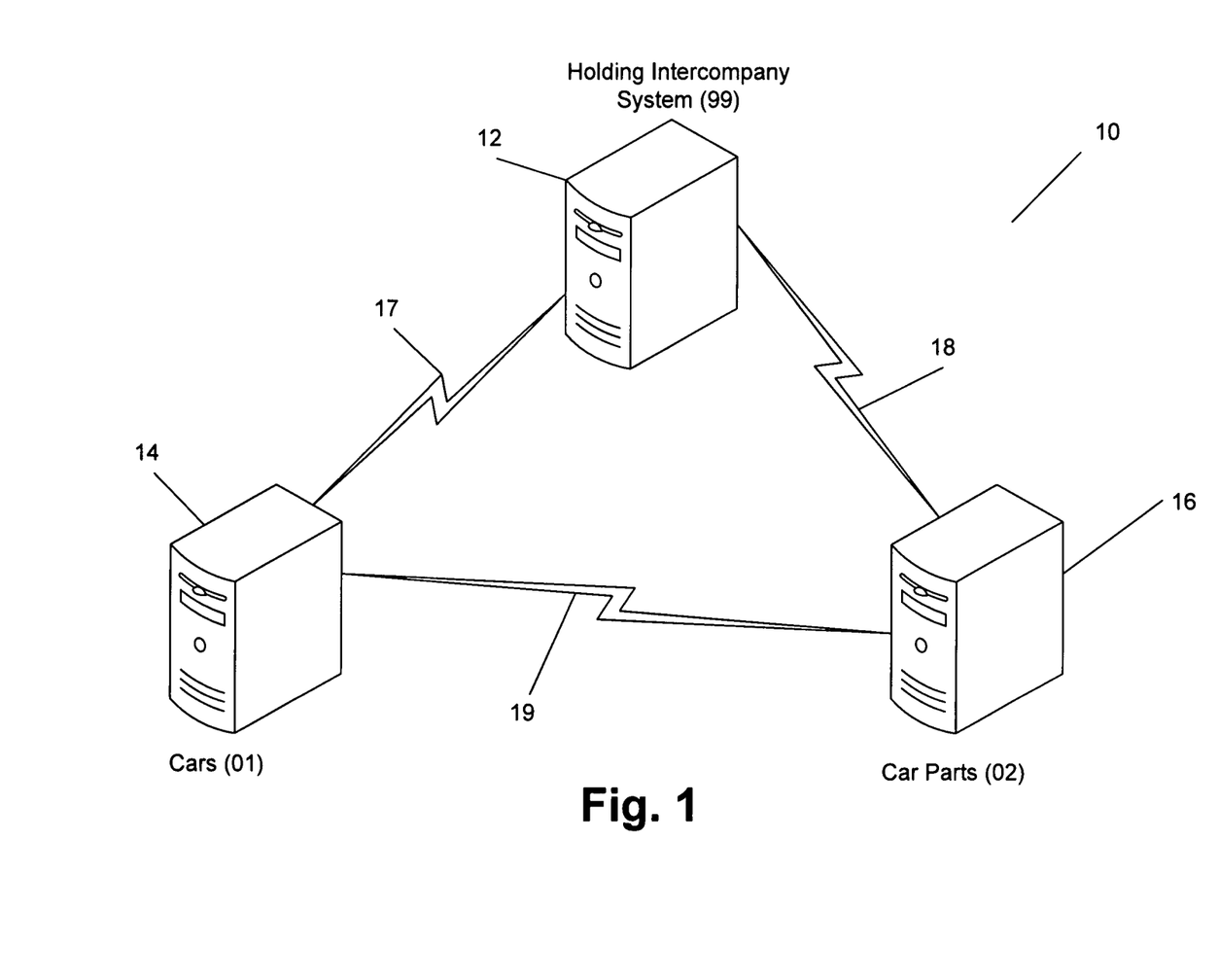
FIG. 1 is a block diagram of a system that implements one embodiment of the invention.

FIG. 1 is a block diagram of a system 10 that implements one embodiment of the invention. FIG. 1 illustrates a simplified example for an overall holding company, Holding Corp. ("Holding"), that includes two corporate subsidiary legal entities: Cars Corp. ("Cars") that manufactures and sells cars, and Car Parts Corp. ("Car Parts") that manufactures and sells car parts. Car Parts can sell car parts internally to Cars as well as externally to companies that are not part of Holding. The example of FIG. 1 is simplified in that it includes only one holding company and two subsidiaries. However, embodiments can be implemented for a company with any number of subsidiaries, and can include sub-holding companies for groups of subsidiaries.

In one embodiment, each subsidiary maintains its own general ledgers using a financial accounting system. Therefore, Cars operates general ledger system 14 and Car Parts operates general ledger system 16. General ledger systems 14 and 16 in one embodiment are computer systems that execute general ledger software. In one embodiment, the general ledger software is "General Ledger" from Oracle Corp. In addition, Holding operates an intercompany system 12 that provides the functionality disclosed in more detail below to generate an accounting elimination entry each time an intercompany transaction is executed. Systems 12, 14 and 16 are in communication with each other via links 17-19. Links 17-19 can be any type of link that allows the systems to transmit data to each other, such as the Internet or other type of telecommunication network.

Figure 2:
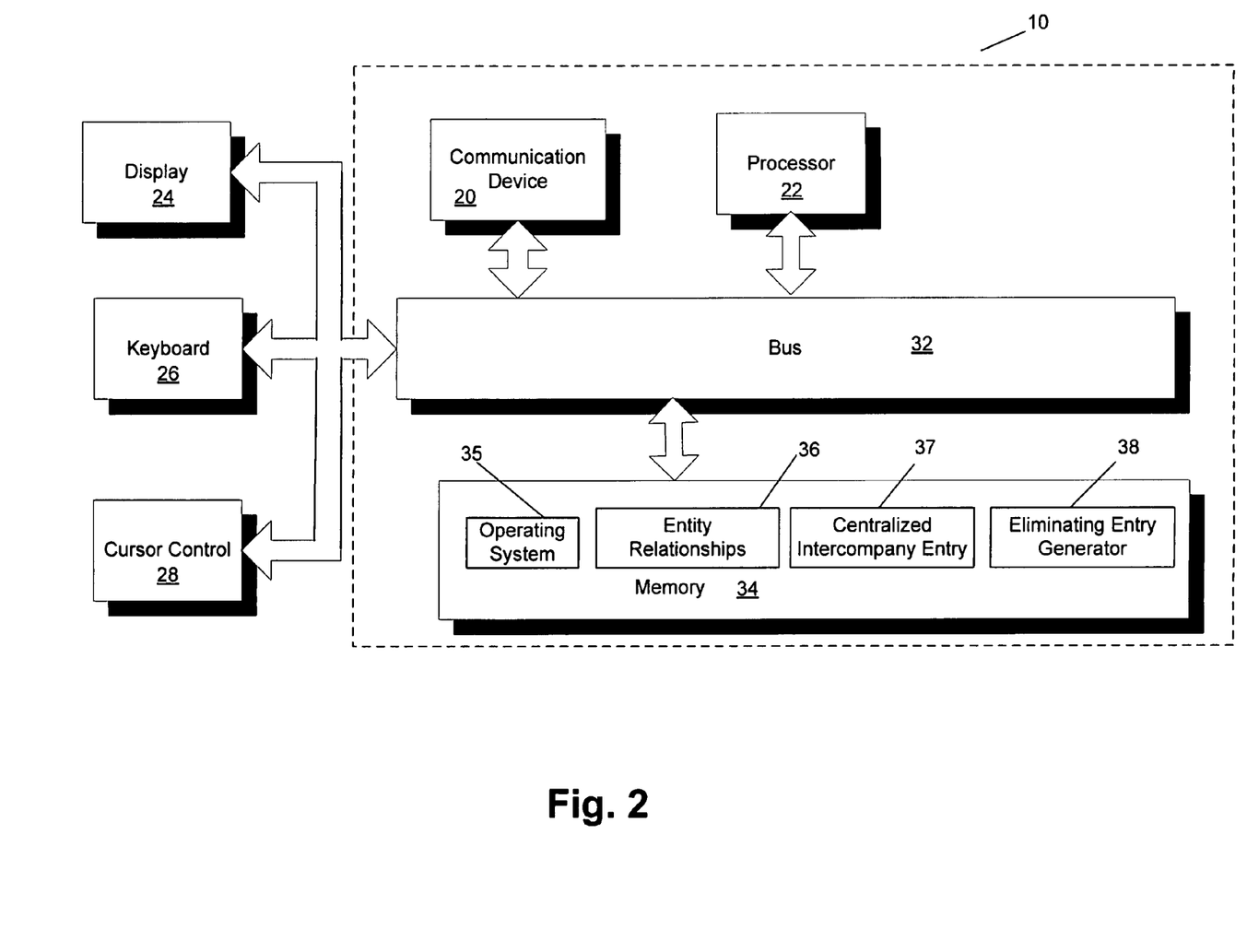
FIG. 2 is a block diagram of the system that can implement an embodiment of the present invention.

FIG. 2 is a block diagram of system 12 that can implement an embodiment of the present invention. System 10 includes a bus 32 or other communication mechanism for communicating information, and a processor 22 coupled to bus 32 for processing information. Processor 22 may be any type of general or specific purpose processor. System 10 further includes a memory 34 for storing information and instructions to be executed by processor 22. Memory 34 can be comprised of any combination of random access memory ("RAM"), read only memory ("ROM"), static storage such as a magnetic or optical disk, or any other type of computer readable media. System 10 further includes a communication device 20, such as a network interface card, to provide access to links 17 and 18.

Computer readable media may be any available media that can be accessed by processor 22 and includes both volatile and nonvolatile media, removable and non-removable media, and communication media. Communication media may include computer readable instructions, data structures, program modules or other data.

Processor 22 is further coupled via bus 32 to a display 24, such as a Liquid Crystal Display ("LCD"), for displaying information to a user. A keyboard 26 and a cursor control device 28, such as a computer mouse, is further coupled to bus 32 to enable a user to interface with system 10.

In one embodiment, memory 34 stores software modules that provide functionality when executed by processor 22. The modules include an operating system 35 that provides operating system functionality for system 10. The modules further include an entity relationships module 36 that stores and defines the relationships between the legal entities of the company and defines a target for eliminating entries between each pair of legal entities when an intercompany transaction is executed. A centralized intercompany entry module 37 is an entry and approval system that allows parties to an intercompany transaction to approve a single source transaction and then have the two opposing side ledger entries generated automatically. An eliminating entry generator module 38 generates eliminating entries based on intercompany transactions.

In operation, entity relationships module 36 defines an eliminations company, designated in one embodiment by an accounting ledger number, for each pair of subsidiary companies that would be involved in an intercompany transaction. In one embodiment, each elimination company is defined per parent company, so as in FIG. 1, elimination company 99 is defined for Holding, while company 01 and company 02 is defined for Cars and Car Parts, respectively.

Figure 3:
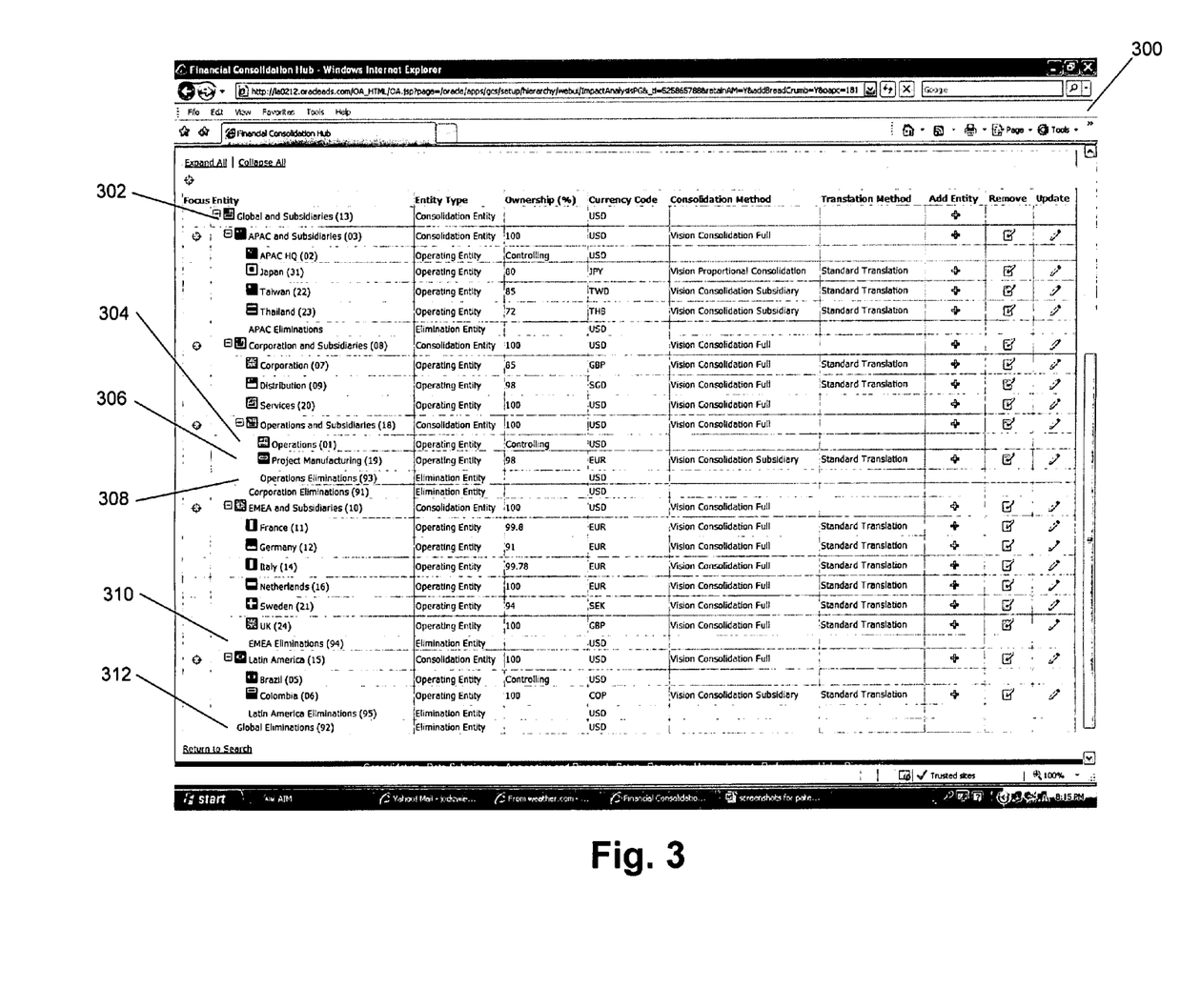
FIG. 3 is an illustration of a user interface generated by the entity relationships module in accordance with one embodiment.

FIG. 3 is an illustration of a user interface 300 generated by entity relationships module 36 in accordance with one embodiment. User interface 300 displays the hierarchical structure of a company called "Global" and its subsidiaries (at 302). In the example of FIG. 3, many of the companies are named for the country in which they are located—thus the items listed in the entity column represent companies rather than countries. There is a separate eliminations entity for each consolidation point (i.e., each parent in the hierarchy) and this comes below all the children for that parent. The number in parentheses is the company number for each entity. In one embodiment, all elimination entities use numbers in the 90s.

For example, user interface 300 displays a company called "Operations" (at 304), which uses company 01, and a separate company called "Project Manufacturing" (at 306), which uses company 19. Any intercompany transactions between them are eliminated against "Operations Eliminations" (at 308), which uses company 93, as the transactions are approved. Similarly, any intercompany transactions between "Netherlands" (company 16) and "Sweden" (company 21) are eliminated against "EMEA Eliminations" (company 94, at 310).

However, any intercompany transactions between Operations and Sweden are eliminated against "Global Eliminations" (company 92, at 312) because this is the eliminations entity for the common parent of Operations and Sweden (i.e., "Global" and "Subsidiaries') because it is the first point in the hierarchy where they come together.

In one embodiment, the functionality of FIG. 3 and entity relationships module 36 is provided by the "Financial Consolidation Hub" from Oracle Corp.

Therefore, entity relationships module 36 provides, for any pair of intracompany trading partners, the point they come together in the hierarchy (i.e., the common parent) and therefore which eliminations entity to use to generate the accounting elimination entry as disclosed below.

Figure 4:
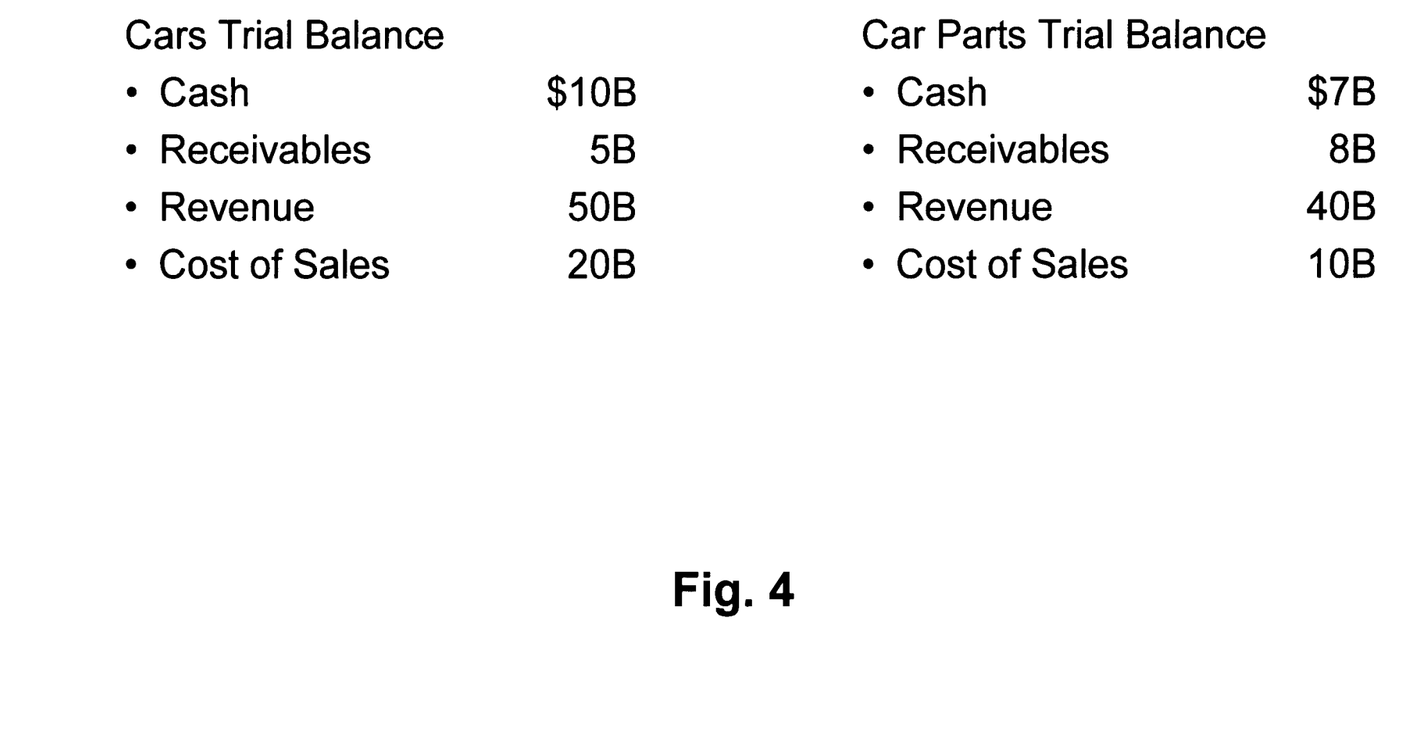
FIG. 4 shows example trial balances for Cars and Car Parts of FIG. 1 for the year 2XXX.

As an example of the need for having and identifying an eliminations entry, FIG. 4 shows example trial balances for Cars and Car Parts of FIG. 1 for year 2XXX. Assume in 2XXX Cars sold $50B worth of cars and Car Parts sold $40B worth of car parts. However, of that $40B, $10B was sold to Cars as an intercompany transaction. If the $10B that was sold to Cars was not identified, the parent company of Cars and Car Parts, Holding, would have revenue for 2XXX calculated to be $90B, which would be incorrect. Therefore, $10B of revenue, and the accompanying cost of sales, needs to be eliminated when calculating the financials for Holding. In known prior art systems and methods, this would typically be done at the month-end consolidation, which means accurate financial information for Holding would only be available at month-end.

Figure 5:
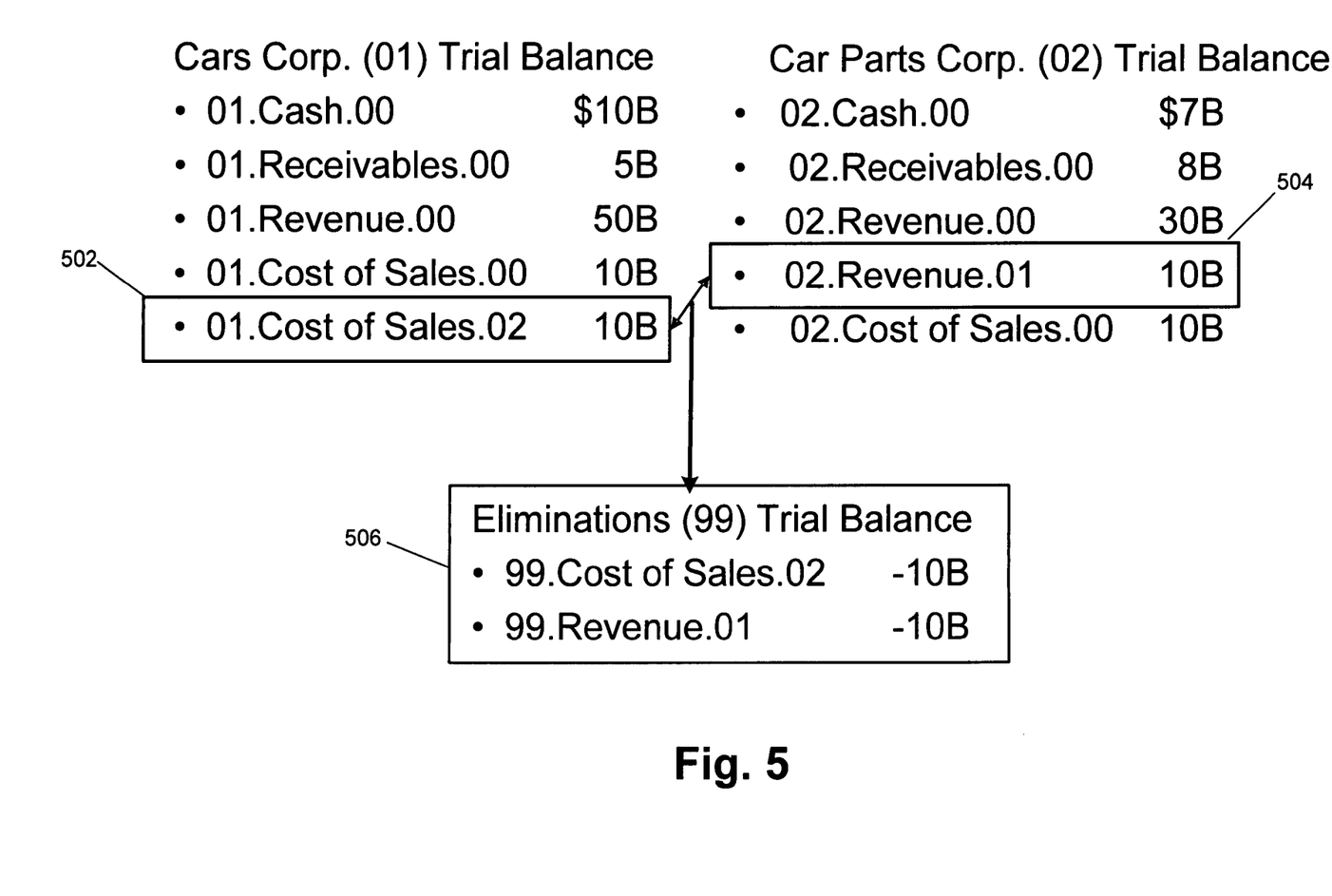
FIG. 5 shows example trial balances Cars and Car Parts of FIG. 1 for 2XXX in which a $10B intercompany transfer has been identified.

FIG. 5 shows example trial balances Cars and Car Parts of FIG. 1 for 2XXX in which the $10B intercompany transfer has been identified. In FIG. 5, Cars is assigned as company 01 and Car Parts is assigned as company 02. Each transaction for an entity has an identity of the "trading partner" so that transaction 502 ends with "02" indicating it was with Car Parts, and transaction 504 ends with "01" indicating it was with Cars. Eliminations entry 506 is generated for Eliminations Entity (99) to account for the intercompany $10B transaction. Eliminations entry 506 removes the extra $10B in cost of sales from Car Parts and the extra $10B in revenue from Cars. Therefore, Holding can use Eliminations entry 506 to calculate accurate financial information by accounting for the intercompany transaction in the overall Holding financial determinations.

In one embodiment, the intercompany transactions must be identified by the eliminations entity so that an eliminations entry can be generated. In one embodiment, centralized intercompany entry module 37 provides this functionality by requiring a party that is initiating an intercompany transaction (referred to as the "initiator" or "sender" entity) to enter an intercompany transaction on the eliminations entity financial system and wait for approval. So, for example, in the embodiment of FIG. 1, if Cars initiates the intercompany transaction, Cars will enter the transaction on system 12. System 12 then send the request to the other party of the intercompany transaction (referred to as the "receiver" entity), Car Parts, and asks for approval. When the transaction is approved, the necessary accounting entry is generated on both the initiator's and receiver's financial systems (i.e., systems 14 and 16, respectively).

Figure 6:
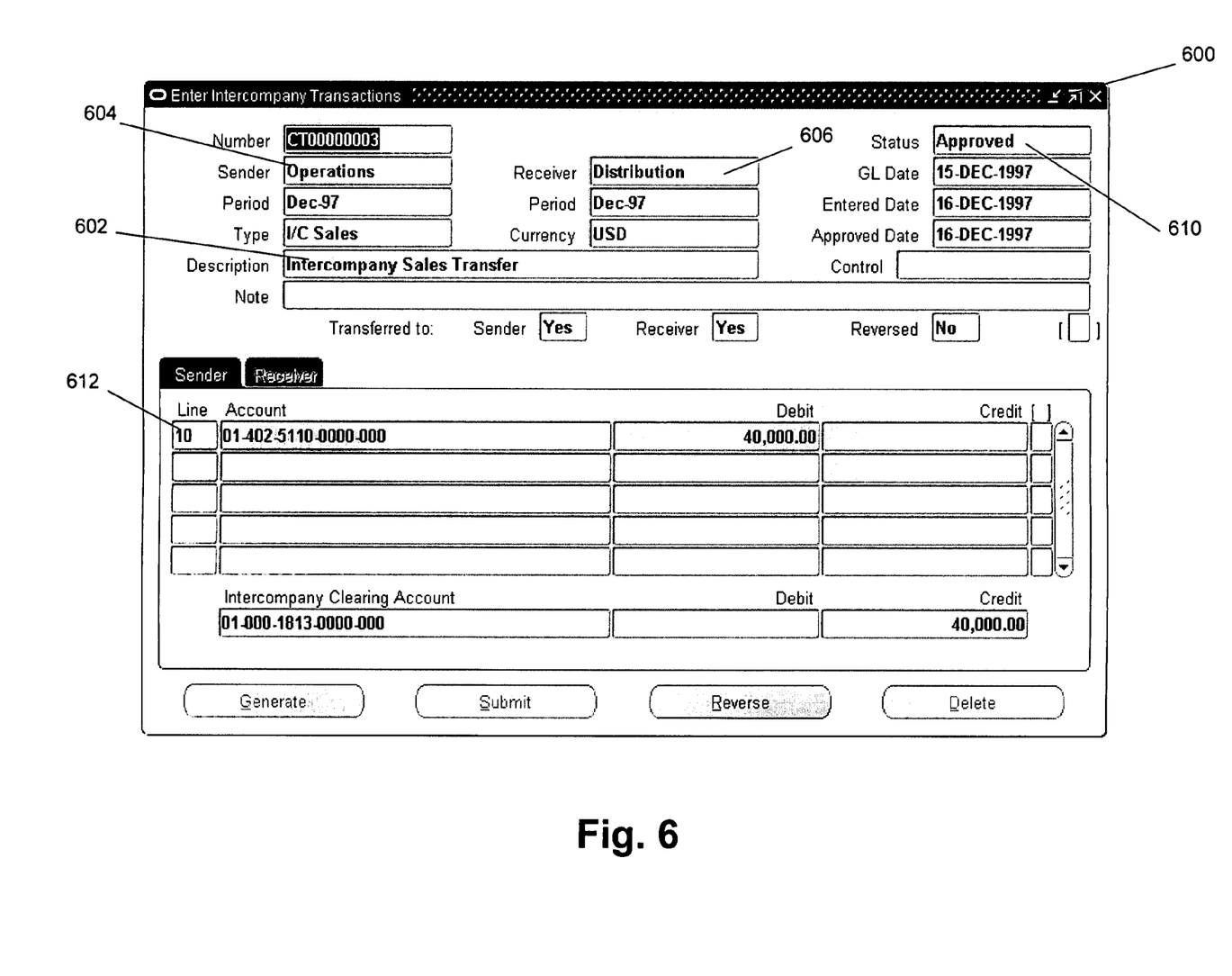
FIG. 6 illustrates a user interface for the intercompany entry module in accordance with one embodiment.
Figure 7:
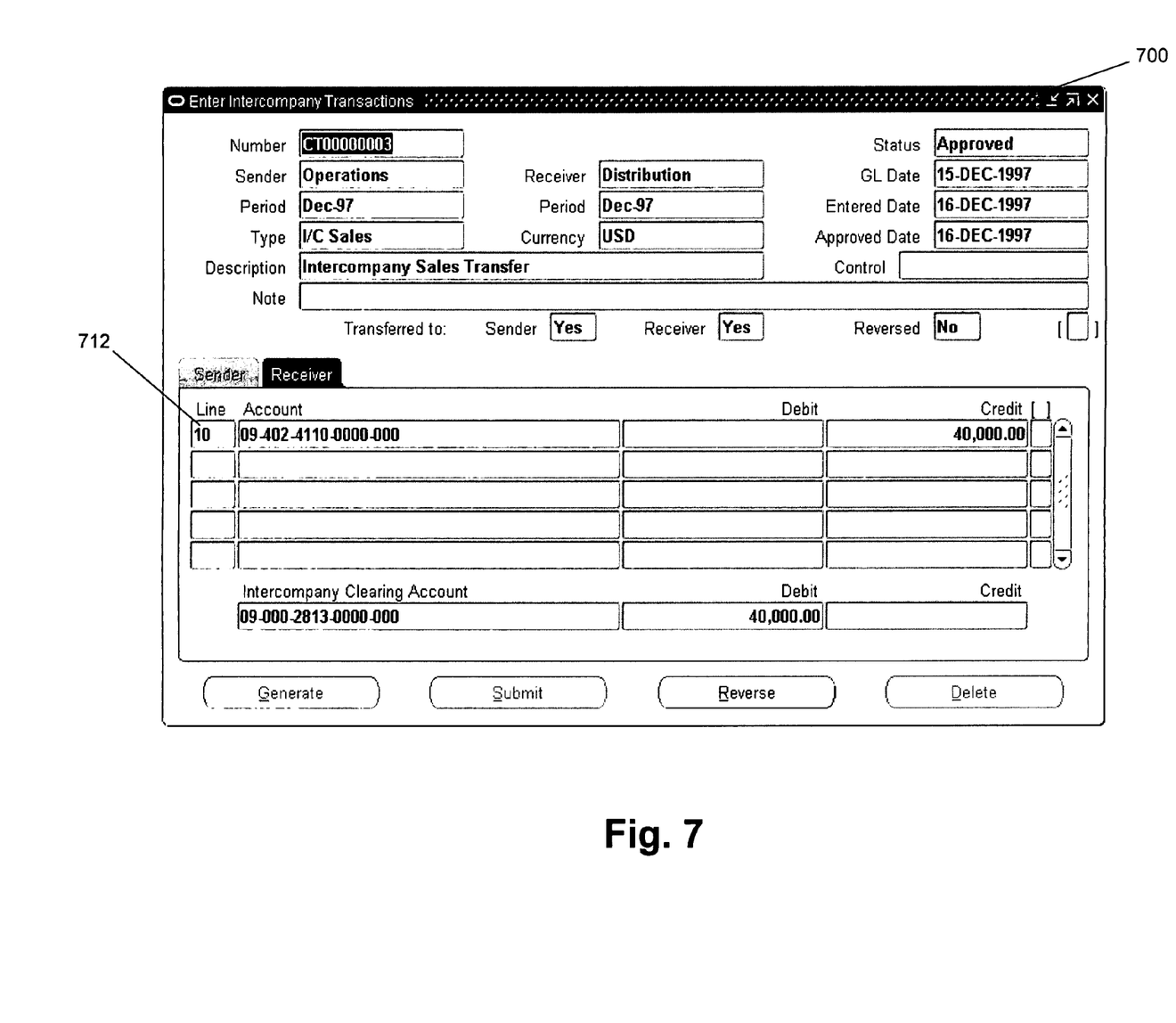
FIG. 7 illustrates a user interface for the intercompany entry module in accordance with one embodiment for the receiver side of the intercompany transaction of FIG. 6.

FIG. 6 illustrates a user interface 600 for intercompany entry module 37 in accordance with one embodiment. User interface 600 shows an accounting entry generated by an intercompany transaction (field 602) between a sender "Operations" (field 604) and a receiver "Distribution" (field 606) after approval of the transaction (field 610). The accounting entry for the sender (company (01)), shown at 612, will ultimately be posted in the Sender's general ledger. FIG. 7 illustrates a user interface 700 for intercompany entry module 37 in accordance with one embodiment for the receiver side of the intercompany transaction of FIG. 6. The accounting entry for the receiver (company (09)), shown at 712 will ultimately be posted in the Receiver's general ledger.

In one embodiment, the functionality of FIGS. 6 and 7 and intercompany entry module 37 is provided by the "Advanced Global Intercompany System" from Oracle Corp.

Figure 8:
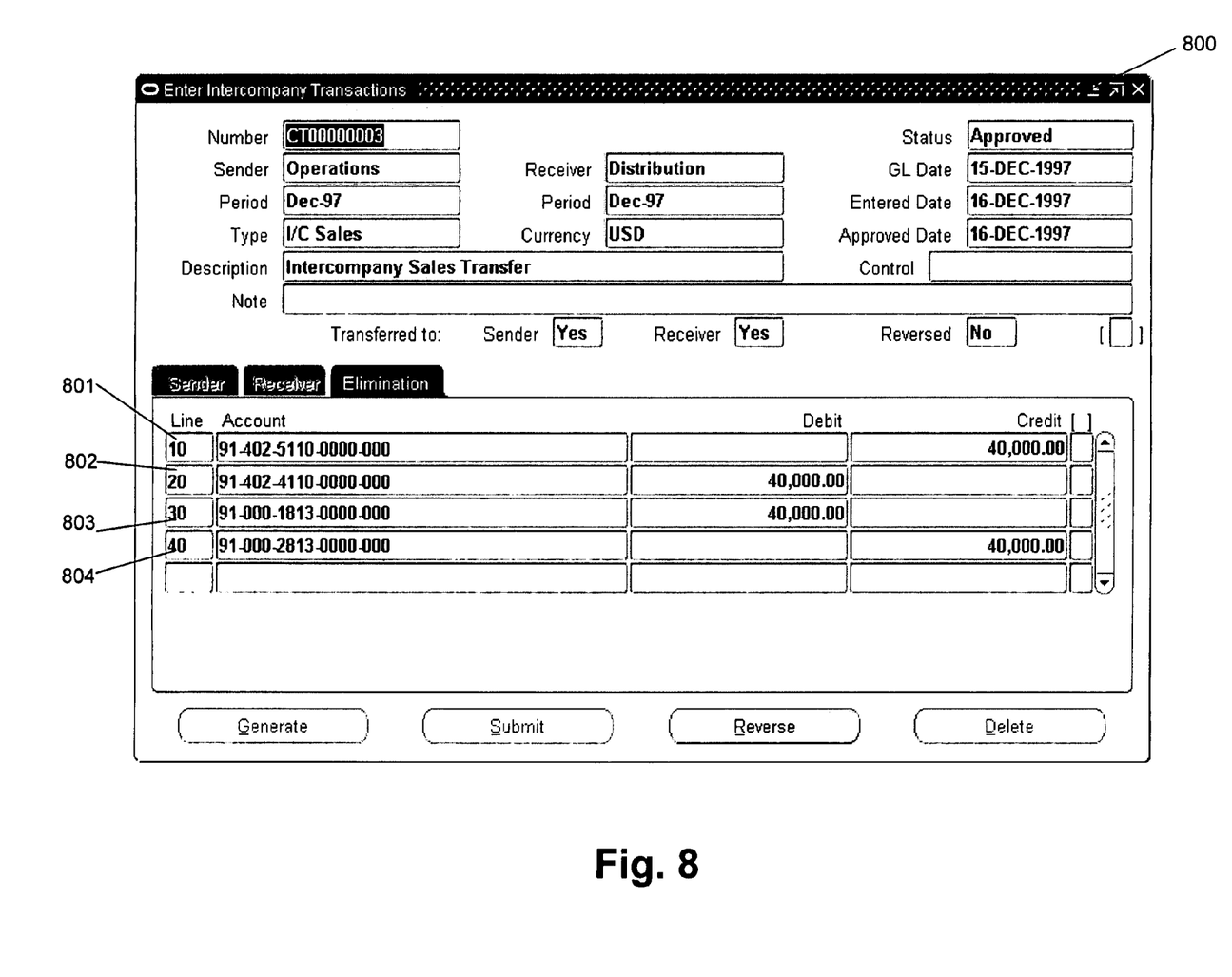
FIG. 8 illustrates a user interface for the eliminating entry generator module in accordance with one embodiment.

In one embodiment, eliminating entry generator module 38 generates an eliminating entry for each intercompany transaction that is identified by intercompany entry module 37. In one embodiment, at the time the intercompany transaction is approved, system 10 generates not only the initiator and receiver accounting entries but the elimination entry as well. The elimination entry in one embodiment is generated before another approval for an intercompany transaction is received. FIG. 8 illustrates a user interface 800 for eliminating entry generator module 38 in accordance with one embodiment. The entries listed in fields 801-804 are the elimination entries for the elimination entity, referred to as company (91).

Figure 9:
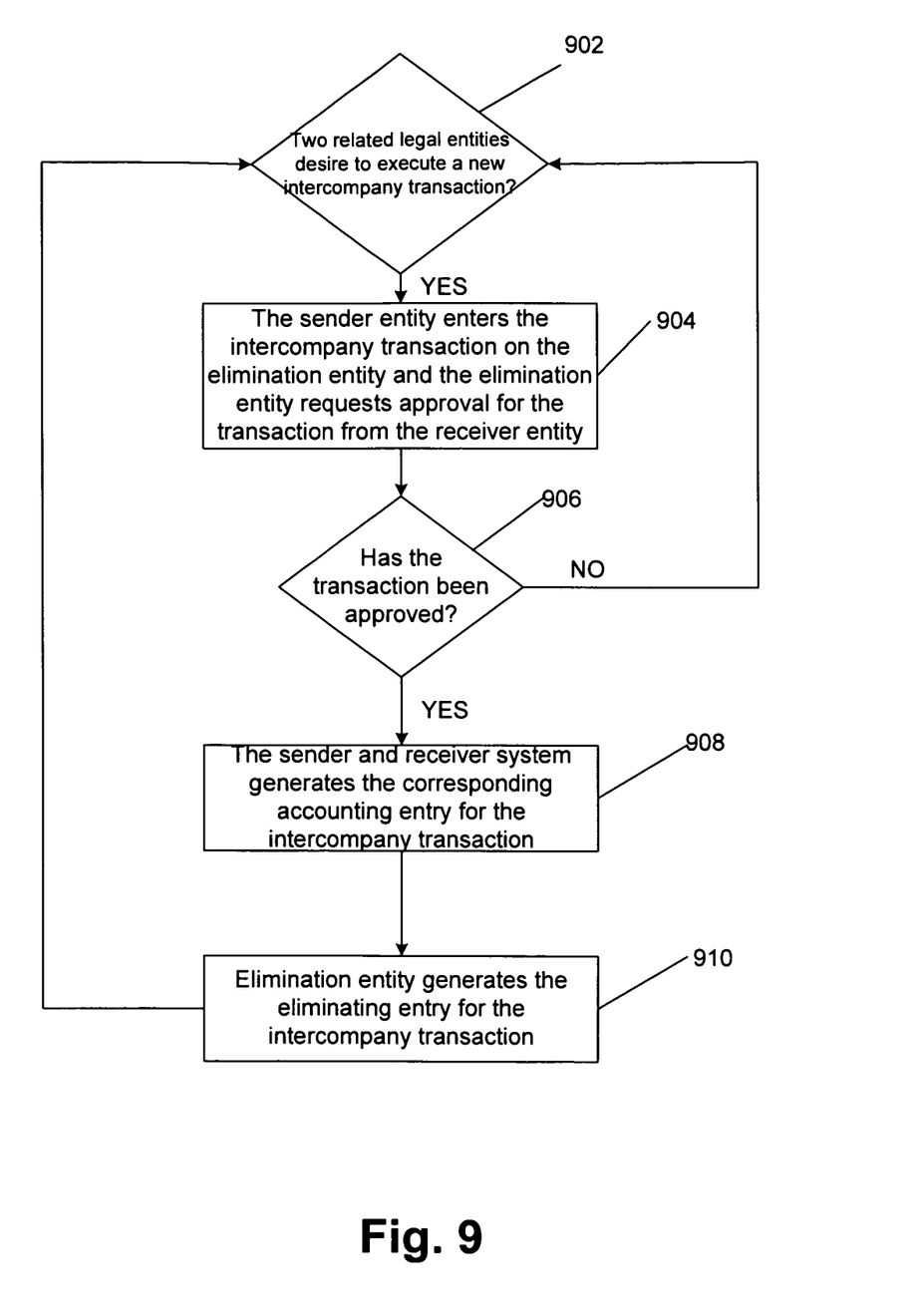
FIG. 9 is a flow diagram of the functionality of the system in accordance with one embodiment when generating an accounting elimination entry for an intercompany transaction.

FIG. 9 is a flow diagram of the functionality of system 10 in accordance with one embodiment when generating an accounting elimination entry for an intercompany transaction. In one embodiment, the functionality of the flow diagram of FIG. 9 is implemented by software stored in memory and executed by a processor. In other embodiments, the functionality can be performed by hardware, or any combination of hardware and software.

At 902, two related legal entities desire to execute a new intercompany transaction. The relationship between the two entities and the elimination entity for the two entities is defined by entity relationships module 36 of FIG. 1.

At 904, the sender entity enters the intercompany transaction at the elimination entity, and the elimination entity requests approval for the transaction from the receiver entity.

At 906, it is determined whether the receiver entity has approved the transaction. If not, the flow returns to 902. In another embodiment, the request for approval can be sent directly from the sender entity to the receiver entity, as long as the elimination entity is informed of the details of the transaction and whether the transaction has been approved.

At 908, if the transaction has been approved, the sender and receiver system generates the corresponding accounting entry for the intercompany transaction.

At 910, the elimination entity generates the eliminating entry for the intercompany transaction. The eliminating entry in one embodiment is the general ledger entries that remove the financial impact on the holding company from the accounting entries for the intercompany transaction. Flow then continues to 902 where it continues for the next intercompany transaction.

As disclosed, embodiments generate the necessary eliminating entries at the time that the originating intercompany entries are recorded. Therefore, it does the matching and eliminating real-time, as transactions are booked, rather than waiting until the end of the month when a high volume of intercompany activity complicates the process. This allows enterprises to more tightly control their intercompany process, identifying breaks that will need to be investigated much earlier than during the crunch time of the month-end close. Further, it gives enterprises an accurate financial picture throughout the month instead of only at month-end or when the consolidation process takes place.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A non-transitory computer readable medium having instructions stored thereon that, when executed by a processor, causes the processor to:

define a hierarchy relationship between entities of a company, wherein the entities comprise a first entity, a second entity, and a third entity, wherein the first entity and the second entity are subsidiaries of the third entity, and wherein the third entity is the parent of the first entity and the second entity;

define an eliminations entity for each pair of subsidiaries involved in an intercompany transaction, wherein there is a separate eliminations entity for each parent in the hierarchy;

receive an intercompany transaction between the first entity and the second entity from the first entity;

identify, by the eliminations entity, the intercompany transaction between the first entity and the second entity;

send a request for approval of the intercompany transaction between the first entity and the second entity to the second entity;

receive an approval of the intercompany transaction between the first entity and the second entity from the second entity; and generate an eliminating entry for the intercompany transaction upon receiving the approval, wherein the eliminating entry is associated with the eliminations entity for a common parent of the first entity and the second entity, wherein the eliminating entry is generated before a second approval is received.

2. The computer readable medium of claim 1, wherein the first entity and the second entity are subsidiaries of a third entity that generated the eliminating entry.

3. The computer readable medium of claim 2, wherein the third entity is an elimination company of the first entity and the second entity.

4. The computer readable medium of claim 1, wherein the eliminating entry is generated for every intercompany transaction at approximately a time that each intercompany transaction is approved.

5. The computer readable medium of claim 1, wherein the intercompany transaction comprises general ledger data.

6. A method of operating a computer system for financial transactions comprising:

defining, at a processor, a hierarchy relationship between entities of a company, wherein the entities comprise a first entity, a second entity, and a third entity, wherein the first entity and the second entity are subsidiaries of the third entity, and wherein the third entity is the parent of the first entity and the second entity;

defining, at the processor, an eliminations entity for each pair of subsidiaries involved in an intercompany transaction, wherein there is a separate eliminations entity for each parent in the hierarchy;

receiving, at the computer system, an intercompany transaction between the first entity and the second entity from the first entity;

identifying, by the eliminations entity, the intercompany transaction between the first entity and the second entity;

sending, by the computer system, a request for approval of the intercompany transaction between the first entity and the second entity to the second entity;

receiving, at the computer system, an approval of the intercompany transaction between the first entity and the second entity from the second entity; and generating, at the computer system, an eliminating entry for the intercompany transaction upon receiving the approval, wherein the eliminating entry is associated with the eliminations entity for a common parent of the first entity and the second entity, wherein the eliminating entry is generated before a second approval is received.

7. The method of claim 6, wherein the eliminating entry is generated for every intercompany transaction at approximately a time that each intercompany transaction is approved.

8. A financial computer system comprising:
means for defining a hierarchy relationship between entities of a company, wherein the entities comprise a first entity, a second entity, and a third entity, wherein the first entity and the second entity are subsidiaries of the third entity, and wherein the third entity is the parent of the first entity and the second entity;
means for defining an eliminations entity for each pair of subsidiaries involved in an intercompany transaction, wherein there is a separate eliminations entity for each parent in the hierarchy;
means for receiving an intercompany transaction between the first entity and the second entity from the first entity;
means for identifying, by the eliminations entity, the intercompany transaction between the first entity and the second entity;
means for sending a request for approval of the intercompany transaction between the first entity and the second entity to the second entity;
means for receiving an approval of the intercompany transaction between the first entity and the second entity from the second entity; and
means for generating an eliminating entry for the intercompany transaction upon receiving the approval, wherein the eliminating entry is associated with the eliminations entity for the common parent of the first entity and the second entity,
wherein the eliminating entry is generated before a second approval is received.

9. A financial computer system comprising:
a processor;
an entity relationships module adapted to define a hierarchy relationship between entities of a company, wherein the entities comprise a first entity, a second entity, and a third entity, wherein the first entity and the second entity are subsidiaries of the third entity, and wherein the third entity is the parent of the first entity and the second entity and define an eliminations entity for each pair of subsidiaries involved in an intercompany transaction, wherein there is a separate eliminations entity for each parent in the hierarchy;
a centralized intercompany entry module coupled to the entity relationships module and adapted to allow the financial computer system to receive an intercompany transaction from the first entity, to allow the eliminations entity to identify the intercompany transaction between the first entity and the second entity, to allow the financial computer system to send a request for approval of the intercompany transaction between the first entity and the second entity to the second entity, to allow the financial computer system to receive an approval of the intercompany transaction between the first entity and the second entity from the second entity, and to allow parties to the intercompany transaction between the first entity and the second entity to approve the intercompany transaction; and
an eliminating entry generator coupled to the centralized intercompany entry module and adapted to generate an eliminating entry when the intercompany transaction is approved, wherein the eliminating entry is associated with the eliminations entity for a common parent of the first entity and the second entity,
wherein the eliminating entry is generated before a second approval is received.

10. The financial computer system of claim 9, wherein the eliminating entry is generated for the intercompany transaction at approximately the same time that the intercompany transaction is approved.

11. The method of claim 6, further comprising:
receiving the intercompany transaction from the first entity; and
receiving the approval from the second entity.

12. The method of claim 6, wherein the first entity and the second entity are subsidiaries of a third entity that generated the eliminating entry.

13. The method of claim 12, wherein the third entity is an elimination company of the first entity and the second entity.

14. The method of claim 6, wherein the intercompany transaction comprises general ledger data.

15. The financial computer system of claim 9, wherein the intercompany entry module is further adapted to:
receive the intercompany transaction from the first entity; and
receive the approval from the second entity.

16. The financial computer system of claim 9, wherein the first entity and the second entity are subsidiaries of a third entity that generated the eliminating entry.

17. The financial computer system of claim 16, wherein the third entity is an elimination company of the first entity and the second entity.

* * * * *

UNITED STATES PATENT AND TRADEMARK OFFICE
CERTIFICATE OF CORRECTION

| | | |
|---|---|---|
| PATENT NO. | : 8,655,754 B2 | |
| APPLICATION NO. | : 12/027493 | |
| DATED | : February 18, 2014 | |
| INVENTOR(S) | : Robert C. Zwiebach | |

Page 1 of 1

It is certified that error appears in the above-identified patent and that said Letters Patent is hereby corrected as shown below:

In the Specification:

In column 4, line 5, delete "intracompany" and insert -- intercompany --, therefor.

Signed and Sealed this
Twenty-fourth Day of June, 2014

Michelle K. Lee
*Deputy Director of the United States Patent and Trademark Office*